United States Patent
Andersson et al.

(10) Patent No.: US 11,894,684 B2
(45) Date of Patent: Feb. 6, 2024

(54) UHVDC CONVERTER TRANSFORMER RE-USAGE FOR LCC TO VSC UPGRADE

(71) Applicant: Hitachi Energy Ltd, Zurich (CH)

(72) Inventors: Mats Andersson, Beijing (CN); ChunMing Yuan, Beijing (CN); XiaoBo Yang, Beijing (CN); DaWei Yao, Beijing (CN); Neil-QiNan Li, Beijing (CN)

(73) Assignee: Hitachi Energy Ltd, Zurich (CH)

( * ) Notice: Subject to any disclaimer, the term of this patent is extended or adjusted under 35 U.S.C. 154(b) by 0 days.

(21) Appl. No.: 16/770,521

(22) PCT Filed: Dec. 6, 2017

(86) PCT No.: PCT/CN2017/114850
§ 371 (c)(1),
(2) Date: Jun. 5, 2020

(87) PCT Pub. No.: WO2019/109271
PCT Pub. Date: Jun. 13, 2019

(65) Prior Publication Data
US 2020/0313571 A1   Oct. 1, 2020

(51) Int. Cl.
*H02J 3/36* (2006.01)
*H02M 7/68* (2006.01)

(52) U.S. Cl.
CPC ............... *H02J 3/36* (2013.01); *H02M 7/68* (2013.01)

(58) Field of Classification Search
CPC .... H02J 3/36; H02J 2003/365; H02M 7/4835; H02M 7/7575
See application file for complete search history.

(56) References Cited

U.S. PATENT DOCUMENTS

| | | | |
|---|---|---|---|
| 9,515,565 B2 * | 12/2016 | Gupta | H02M 1/0095 |
| 2008/0007978 A1 * | 1/2008 | Han | H02M 7/7575 363/35 |

(Continued)

FOREIGN PATENT DOCUMENTS

| | | |
|---|---|---|
| CN | 203387196 U | 1/2014 |
| CN | 103997033 A | 8/2014 |

(Continued)

OTHER PUBLICATIONS

O. E. Oni, I. E. Davidson and K. N. I. Mbangula, "A review of LCC-HVDC and VSC-HVDC technologies and applications," 2016 IEEE 16th International Conference on Environment and Electrical Engineering (EEEIC), 2016, pp. 1-7, doi: 10.1109/EEEIC.2016.7555677. (Year: 2016).*

(Continued)

*Primary Examiner* — Fred E Finch, III
(74) *Attorney, Agent, or Firm* — Slater Matsil, LLP

(57) ABSTRACT

A voltage source converter (VSC) system of a high-voltage direct current (HVDC) system is disclosed. The system includes a number of line-commutated converter (LCC) transformers. Each LCC transformer is operable to transform alternate current (AC) voltage. A number of VSC converter units are connected in series and coupled to the plurality of LCC transformers. Each VSC converter unit is operable to convert between the AC voltage and direct current (DC) voltage. A bypass breaker is connected in parallel with at least one of the VSC converter units and operable to be closed to bypass the at least one VSC converter unit.

19 Claims, 8 Drawing Sheets

(56) References Cited

U.S. PATENT DOCUMENTS

| | | | |
|---|---|---|---|
| 2011/0310641 A1* | 12/2011 | Asplund | H02J 3/36 363/35 |
| 2015/0145252 A1* | 5/2015 | Lin | H02M 7/25 290/44 |
| 2016/0141962 A1* | 5/2016 | Outram | H02M 3/33507 363/21.01 |
| 2017/0331390 A1* | 11/2017 | Xu | H02M 5/4585 |
| 2018/0097450 A1 | 4/2018 | Andersson et al. | |
| 2018/0366942 A1* | 12/2018 | Gupta | H02M 1/32 |
| 2019/0252885 A1* | 8/2019 | Lu | H02M 7/483 |
| 2020/0052611 A1* | 2/2020 | Zhang | H02M 7/483 |

FOREIGN PATENT DOCUMENTS

| | | |
|---|---|---|
| CN | 204361682 U | 5/2015 |
| CN | 106505902 A | 3/2017 |
| CN | 106786713 A | 5/2017 |
| CN | 107431357 A | 12/2017 |
| WO | WO-2013185825 A1 * 12/2013 | ............ H02M 7/483 |
| WO | WO-2016179810 A1 * 11/2016 | .............. H02M 7/25 |
| WO | 2016206547 A1 | 12/2016 |

OTHER PUBLICATIONS

Adapa, R., et al., "Feasibility of converting HVDC LCC converter station to VSC converter station," CIGRE USNC Grid of the Future Conference, Cleveland, OH. Oct. 24, 2017. Retrieved from https://cigre-usnc.org/wp-content/uploads/2017/11/LCC-Upgrade-TO-VSC-10-23-17.pdf on May 27, 2021. (Year: 2017).*

Feng, X., et al., "Study on Hybrid HVDC Transmission Technology Used for Ugrading of Conventional HVDC Transmission System," Power System Technology, vol. 41, No. 10, Oct. 2017, 8 pages.

Weihuang, H., et al., "A Novel Refurbishment Scheme for Reforming the Existing LCC-HVDC to Hybrid HVDC," Proceedings of the CSEE, vol. 37, No. 10, May 20, 2017, 8 pages.

* cited by examiner

UHVDC CONVERTER TRANSFORMER RE-USAGE FOR LCC TO VSC UPGRADE

CROSS-REFERENCE TO RELATED APPLICATIONS

This patent application is a national stage filing of International Application No. PCT/CN2017/114850, filed on Dec. 6, 2017, which application is hereby incorporated by reference in its entirety.

TECHNICAL FIELD

Example embodiments disclosed herein generally relate to a power converter system and more particularly, to a voltage-source converter (VS C) system of a high-voltage direct current (HVDC) system and rectifier and inverter stations associated therewith.

BACKGROUND

HVDC (high-voltage direct current) or ultra HVDC (UHVDC) electrical power transmission uses direct current (DC) for transmission of electrical power, which is an alternative to alternate current (AC) electrical power transmission. A converter system can be applied at a rectifier station to convert AC voltage generated by power generation facilities to DC voltage for transmission. Another converter system can be applied at an inverter station to convert the received DC voltage to AC voltage of a predetermined frequency and voltage amplitude for use. HVDC or UHVDC transmission links (for example, 500 kV or 800 kV DC links) are connected between the rectifier and inverter stations to transmit the electric power therebetween. An HVDC system includes the converter system at the rectifier station and the other converter system at the inverter station. Hereinafter, an UHVDC system may be shortly referred to as an HVDC system for the purpose of discussion.

Typically, one or more converter transformers are included in a converter system to transform AC voltage. Additionally, one or more converter units are coupled to the converter transformers to convert input AC voltage to output DC voltage if the converter system is deployed at a rectifier station or to convert input DC voltage to output AC voltage provided to the transformers if the converter system is applied at an inverter station.

There are several types of converter systems, among which a type of line commutated converter (LCC) systems has been widely deployed in virtue of high reliability and power rating requirements. An HVDC system with both LCC systems deployed at the rectifier and inverter stations may be referred to as a LCC HVDC system. However, the LCC systems deployed at inverter stations might suffer from multi-infeed problems. In order to solve the multi-infeed problems and some other potential problems, another type of voltage-source converter (VSC) systems has now become an attractive choice in high voltage and high power transmission and distribution applications. It has been proposed to replace the LCC systems with VSC systems in the rectifier and/or inverter stations of the HVDC system. However, it is generally costly to build new VSC systems.

SUMMARY

Example embodiments disclosed herein propose a solution for building a VSC system of an HVDC system from a LCC HVDC system by reusing converter transformers.

In a first aspect, example embodiments disclosed herein provide a voltage source converter (VSC) system of an HVDC system upgraded from a LCC HVDC system. The VSC system includes a plurality of LCC transformers of the LCC HVDC system, the plurality of LCC transformers being operable to transform alternate current (AC) voltage. The VSC system also includes a plurality of VSC converter units substituting LCC converter units of the LCC HVDC system, the plurality of VSC converter units being connected in series and coupled to the plurality of LCC transformers, and being operable to convert between the AC voltage and direct current (DC) voltage. The VSC system also includes at least one bypass breaker, each of which is connected in parallel with at least one of the plurality of VSC converter units and operable to be closed to bypass the at least one VSC converter unit.

In some embodiments, the number of the at least one bypass breaker is equal to the number of the plurality of VSC converter units, and each bypass breaker is connected in parallel with a respective VSC converter unit.

In some embodiments, the plurality of VSC converter units include a plurality of six-pulse VSC converter units.

In some embodiments, the plurality of VSC converter units include a plurality of modular multi-level converter (MMC) converter units.

In some embodiments, the plurality of VSC converter units include a plurality of full-bridge modular multi-level converter (FB-MMC) converter units.

In some embodiments, the plurality of VSC converter units include a plurality of half-bridge modular multi-level converter (HB-MMC) converter units. The VSC system of the HVDC system further comprises a plurality of diodes connected to the plurality of VSC converter units, respectively.

In some embodiments, the plurality of LCC transformers include a plurality of tap changers reused from the LCC HVDC system.

In some embodiments, a bypass breaker of the at least one bypass breaker is reused from the LCC HVDC system.

In some embodiments, the plurality of LCC transformers include a plurality of three-phase LCC transformers.

In some embodiments, the plurality of LCC transformers include a plurality of two-winding LCC transformers or a plurality of three-winding LCC transformers.

In a second aspect, example embodiments disclosed herein provide a rectifier station comprising a converter system of the first aspect.

In a third aspect, example embodiments disclosed herein provide an inverter station comprising a converter system of the first aspect.

Through the embodiments of the present disclosure, by reusing costly LCC transformers from a LCC HVDC system and with the help of the bypass breaker(s), a VSC system of an HVDC system can be built and work appropriately in a cost-effective way.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

DETAILED DESCRIPTION

Figure 1:
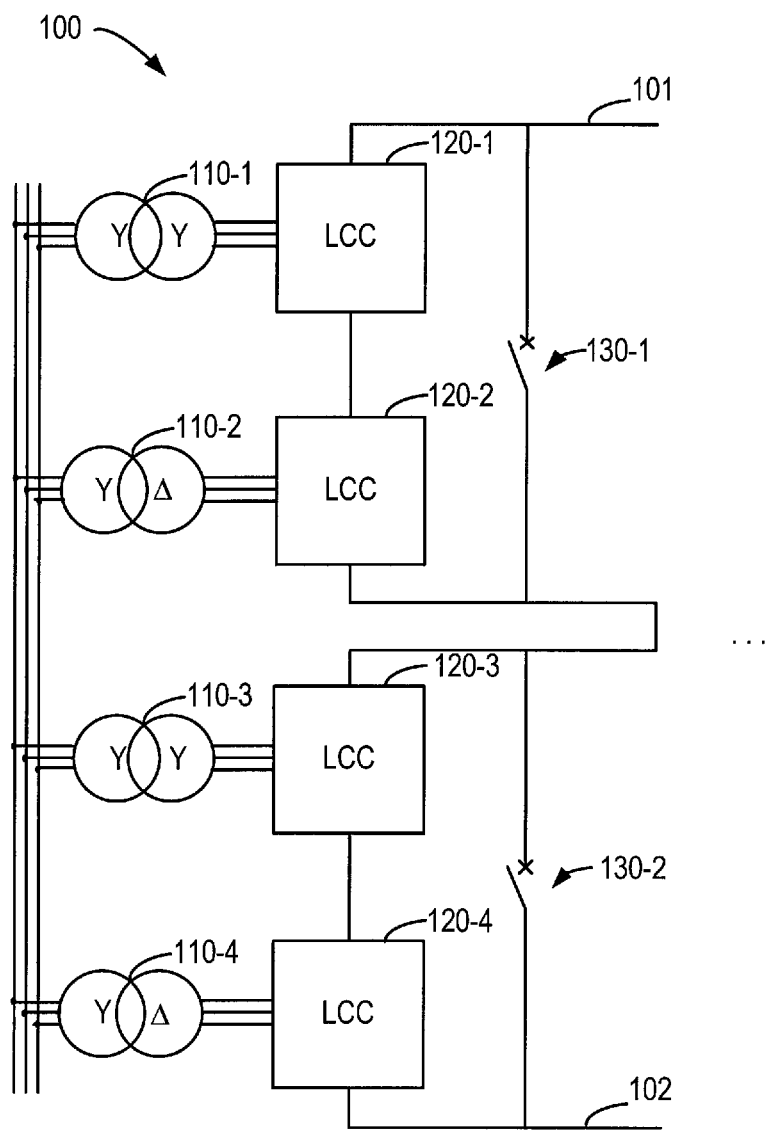
FIGS. 1 and 4 illustrate schematic diagrams of examples of LCC systems.

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment."

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the Figures. Other definitions, explicit and implicit, may be included below.

As mentioned above, it is desired to replace some line commutated converter (LCC) systems that have been deployed for High-voltage direct-current (HVDC) or ultra HVDC (UHVDC) systems with voltage-source converter (VSC) systems in order to solve problems existing in the LCC HVDC systems such as the multi-infeed problem. However, building new VSC systems may be a time-consuming exercise with a high economic cost. The cost will be reduced if some equipment in the LCC systems can be reused. The inventors have found that LCC transformers are the most costly components in a LCC system (around half of the overall system cost). In addition, LCC transformers are of high quality due to the high harmonic content and high power rating requirements required by the LCC technology.

According to embodiments of the present disclosure, there is proposed a solution for building a VSC system of an HVDC system from a LCC system by reusing LCC transformers of a LCC HVDC system. The LCC HVDC system has been built and includes LCC systems at both rectifier and inverter stations. In addition to the LCC transformers reused from the LCC HVDC system, the VSC system also includes a plurality of VSC converter units coupled to the LCC transformers, the VSC converter units substitute LCC converter units of the LCC HVDC system. The VSC converter units are connected in series to convert between DC voltage and the AC voltage. One or more bypass breakers are further included in the VSC system, each of which is connected in parallel with at least one of the VSC converter units and operable to be closed to bypass the at least one VSC converter units. In this way, the costly LCC transformers in the LCC HVDC system can be reused for the VSC system of an HVDC system. With the introduction of the bypass breaker(s) in the VSC system, the VSC system can operate at full DC voltage when all the bypass breaker(s) are opened, or operate at lower DC voltage when one or more of the bypass breaker(s) are closed. Therefore, the VSC system can be built and work appropriately in a cost-effective way.

To better illustrate a VSC system with LCC transformers reused from a built LCC HVDC system as proposed in the present disclosure, an arrangement of a built LCC HVDC system is first introduced below. A LCC HVDC system includes LCC systems at both rectifier and inverter stations. A LCC system of the LCC HVDC system typically includes a plurality of LCC transformers and a plurality of LCC converter units coupled to the LCC transformers. FIG. 1 shows a part of an example typical LCC HVDC system 100. For illustration, one LCC system of the LCC HVDC system 100 is depicted in detail. The LCC system of the LCC HVDC system 100 has been built in a single-pole with two twelve-pulse configurations. In operation, if the LCC system of the LCC HVDC system 100 is applied at a rectifier station, AC electric power flows into the LCC system from an AC network. If the LCC system of the LCC HVDC system 100 is applied at an inverter station, DC electric power will flow from the LCC system into an AC network.

As shown, the LCC system of the LCC HVDC system 100 includes a plurality of LCC transformers 110-1, 110-2, 110-3, and 110-4, which may be collectively or individually referred to as LCC transformers 110. The LCC transformers 110 are connected to an AC network and are operable to transform AC voltage input from or output to the AC network (depending on whether the LCC system is applied at the rectifier or inverter station). In the example of FIG. 1, the LCC transformers 110 are illustrated as three-phase two-winding transformers. In other examples, other types of LCC transformers may be utilized in the LCC system of the LCC HVDC system 100, example of which may include three-phase three-winding transformers, single-phase two-winding transformers, single-phase three-winding transformers, and the like.

The LCC system of the LCC HVDC system 100 further includes a plurality of LCC converter units 120-1, 120-2, 120-3, and 120-4, which may be collectively or individually referred to as LCC converter units 120. The LCC converter units 120 are coupled to the LCC transformers 110-1, 110-2, 110-3, and 110-4, respectively, and are connected in series to a DC network. In the single-pole configuration, the LCC converter unit 120-1 is connected to a line 101 of negative or positive polarity and the LCC converter unit 120-4 is connected to a neutral line 102. The voltage between the lines 101 and 102 is the DC voltage input to or output from the DC network, depending on whether the LCC system of the LCC HVDC system 100 is applied at the rectifier or inverter station.

Figure 4:
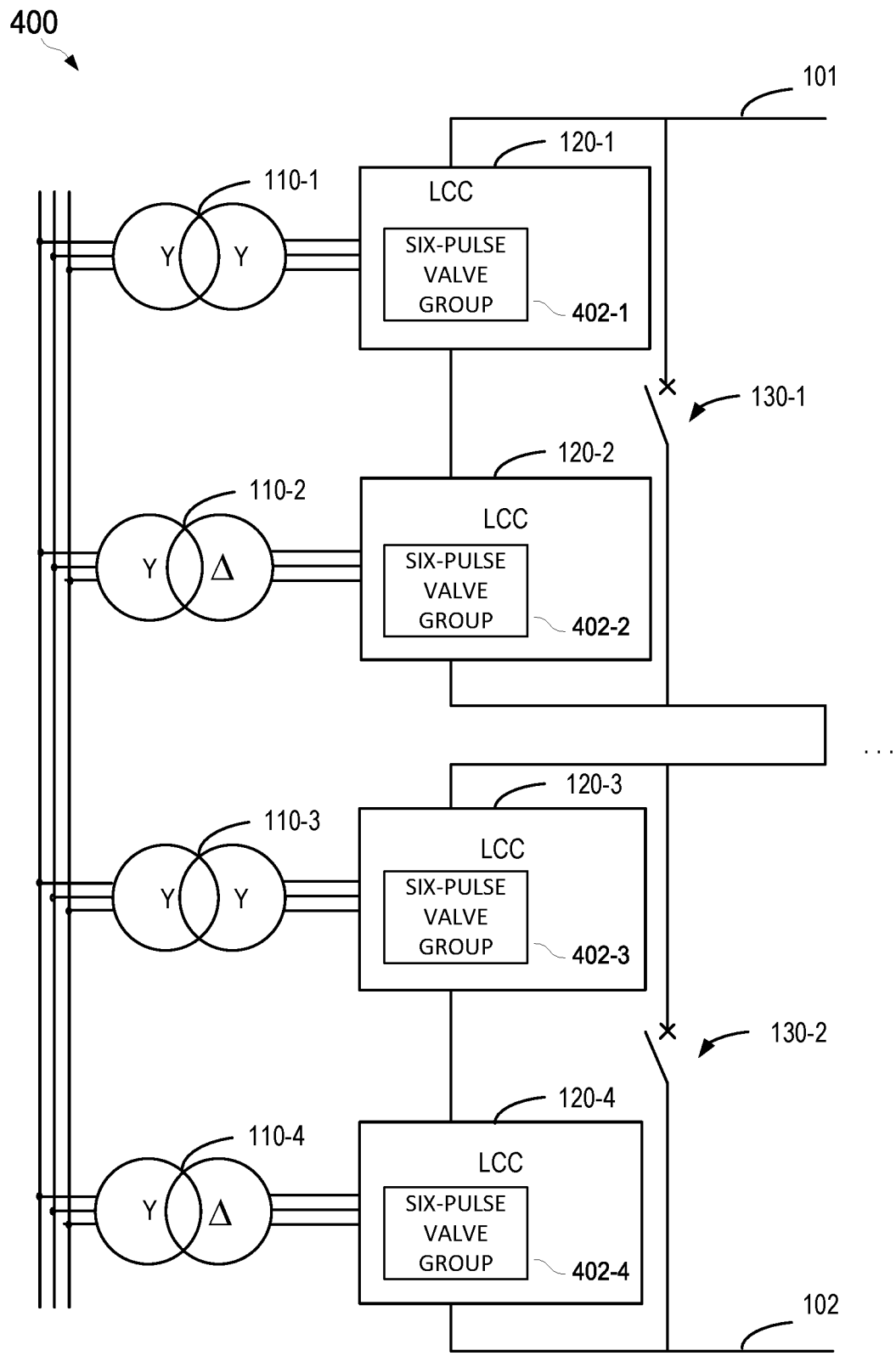

FIG. 4 shows a part of an example typical LCC HVDC system 400. The components and functions attributed to the LCC HVDC system 100 are similarly attributable to the LCC HVDC system 400. As shown, each LCC converter unit 120 may include a six-pulse valve group 402, and thus may be referred to as a six-pulse LCC converter unit. Thus, the LCC converter units 120-1 and 120-2 may form a 12-pulse valve group, and the LCC converter units 120-3 and 120-4 may form another 12-pulse valve group. Referring to FIG. 1 and FIG. 4, the LCC converter units 120 may work together to convert the input AC voltage from the LCC transformers no to DC voltage for supplying to the DC network or to convert input DC voltage from the DC network to AC voltage for passing to the LCC transformers no.

The LCC system of the LCC HVDC system 100 may further include one or more bypass breakers 130-1 and 130-2. The bypass breaker 130-1 is connected in parallel with the LCC converter units 120-1 and 120-2. Similarly, the bypass breaker 130-2 is connected in parallel with the LCC converter units 120-3 and 120-4. The bypass breakers 130-1 and 130-2 may be collectively or individually referred to as bypass breakers 130. By opening one of the bypass breakers 130-1 and 130-2 and closing the other one, the pair of LCC converter units 120-1 and 120-2 or the pair of LCC converter units 120-3 and 120-4 is bypassed and then the LCC system of the LCC HVDC system 100 may operate at fifty percentage of the full DC voltage. If both the bypass breakers 130-1 and 130-2 are opened, the LCC system of the LCC HVDC system 100 may operate at the full DC voltage.

A typical example of LCC system is described above with reference to FIG. 1. The LCC HVDC system 100 may include two LCC systems as shown in FIG. 1, each deployed at one of rectifier and inverter stations. It would be appreciated that other configurations of LCC systems may also be possible depending on the actual deployments. For example, a LCC system may have been built with a bipolar configuration, including an additional arrangement of LCC transformers, LCC converter units, and bypass breakers that is similar as the arrangement of the LCC transformers 110, LCC converter units 120, and bypass breakers 130.

Figure 2A:
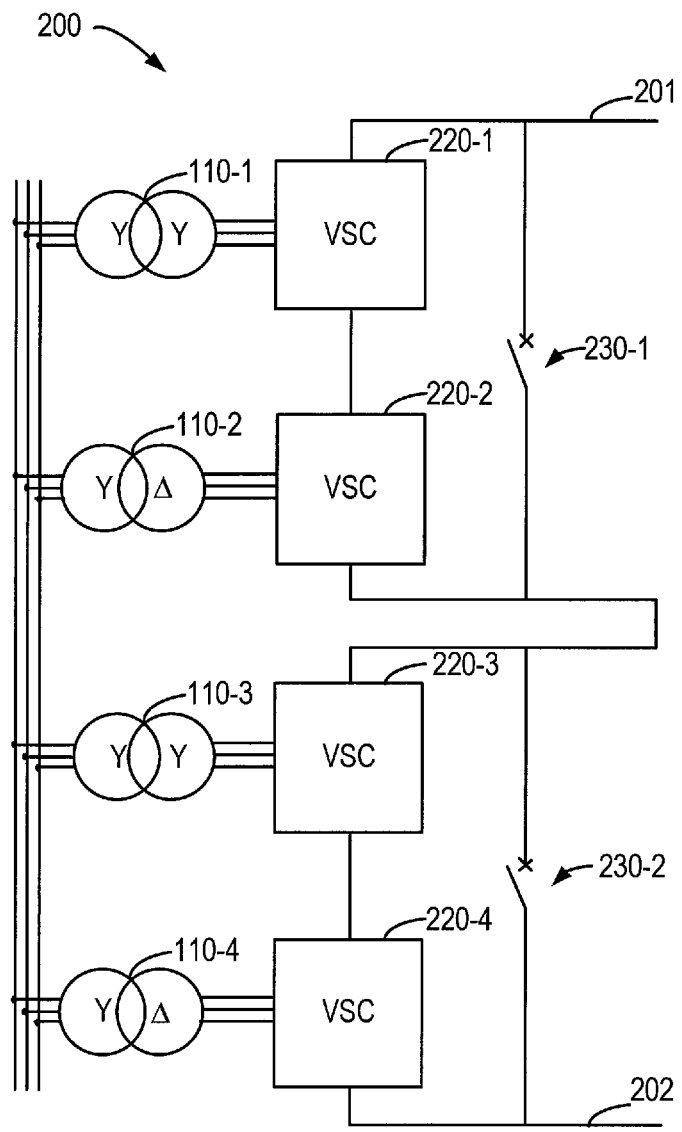
FIGS. 2A-2B illustrate schematic diagrams of VSC systems in accordance with some example embodiments of the present disclosure.

According to embodiments of the present disclosure, a new HVDC system can be upgraded from the LCC HVDC system 100. The LCC transformers 110 of the LCC system in the LCC HVDC system 100 can be reused for building a VSC system. FIG. 2A shows an example of a VSC system 200 according to embodiments of the present disclosure. The upgraded HVDC system of the present disclosure may include two VSC systems 200 at both rectifier and inverter stations. In this case, the HVDC system may also be referred to as VSC HVDC system. In some other embodiments, the upgraded HVDC system may include a VSC system 200 at one of rectifier and inverter stations, and a LCC system at the other one of the rectifier and inverter stations. The detailed arrangement of the VSC system 200 will be discussed below.

As shown in FIG. 2A, the VSC system 200 includes a plurality of LCC transformers 110 that are reused from a LCC system of the existing LCC HVDC system 100 as shown in FIG. 1. In the VSC system 200, the LCC transformers 110 can be connected to an AC network and operate to transform AC voltage that is supplied from or to the AC network. The VSC system 200 further includes a plurality of VSC converter units 220-1, 220-2, 220-3, and 220-4 to convert between the AC voltage and DC voltage using the VSC technology. The VSC converter units 220-1, 220-2, 220-3, and 220-4 may be collectively or individually referred to as VSC converter units 220. The VSC converter units 220 substitute the LCC converter units 120 of the LCC HVDC system 100 and are connected in series to a DC network and coupled to the LCC transformers 110. Specifically, each of the VSC converter units 220 is coupled to one of the LCC transformers 110.

The VSC converter units 220 are connected to a DC network. In a single-pole configuration, the VSC converter unit 220-1 is connected to a line 201 of negative or positive polarity and the VSC converter unit 220-4 is connected to a neutral line 202. The voltage between the lines 201 and 202 is the DC voltage delivered to or from the DC network, depending on whether the VSC system 200 is applied at the rectifier or inverter station. In operation, if AC electric power flows into the VSC system 200 from an AC network, the VSC converter units 220 are operable to convert AC voltage transformed by the LCC transformers 110 to DC voltage that is supplied to a DC network. If DC electric power flows from the VSC system 200 into an AC network, the VSC converter units 220 are operable to convert DC voltage to AC voltage and provide the AC voltage to the LCC transformers 110.

Depending on the valve configuration in the LCC system of the LCC HVDC system 100 from which the LCC transformers 110 are reused, the VSC converter units 220 may be constructed with different valve configurations that can be connected to the LCC transformers 110. In some embodiments, the VSC converter units 220 may be selected as 6-pulse VSC converter units to replace the 6-pulse LCC converter units connected to the LCC transformers in the LCC HVDC system 100, where a 6-pulse VSC converter unit includes a 6-pulse valve group. In some other embodiments, the VSC converter units 220 may include 12-pulse VSC converter units to replace the corresponding LCC converter units 120 used in the built LCC HVDC system 100, where a 12-pulse VSC converter unit includes a 12-pulse valve group. The VSC converter units 220 may be constructed with other valve configurations depending on the configuration of the VSC system 100.

To support appropriate DC voltage in operation of the VSC converter units 220, as shown, the VSC system 200 further includes one or more bypass breakers 230-1, 230-2. Each of the bypass breakers 230-1 and 230-2 is connected in parallel with at least one of the VSC converter units 220. In the example of FIG. 2A, the bypass breaker 230-1 is connected in parallel with the VSC converter units 220-1 and 220-2, and the bypass breaker 230-2 is connected in parallel with the VSC converter units 220-3 and 220-4.

Each of the bypass breakers 230-1 and 230-2 is operable to be closed to bypass the group of VSC converter units 220 with which the bypass breaker 230-1 or 230-2 is connected in parallel. If the group of VSC converter units 220-1 and 220-2 or the group of VSC converter units 220-3 and 220-4 is bypassed, the VSC system 200 may operate at fifty percentage of the full DC voltage. If both the bypass breakers 230-1 and 230-2 are opened, the VSC system 200 may operate at the full DC voltage. In some embodiments, one or both of the bypass breakers 230-1 and 230-2 may be manually and locally operated to close to bypass the corresponding VSC converter units 220. Alternatively, one or both of the bypass breakers 230-1 and 230-2 may be operated remotely, for example, by one or more control signals.

Figure 2B:
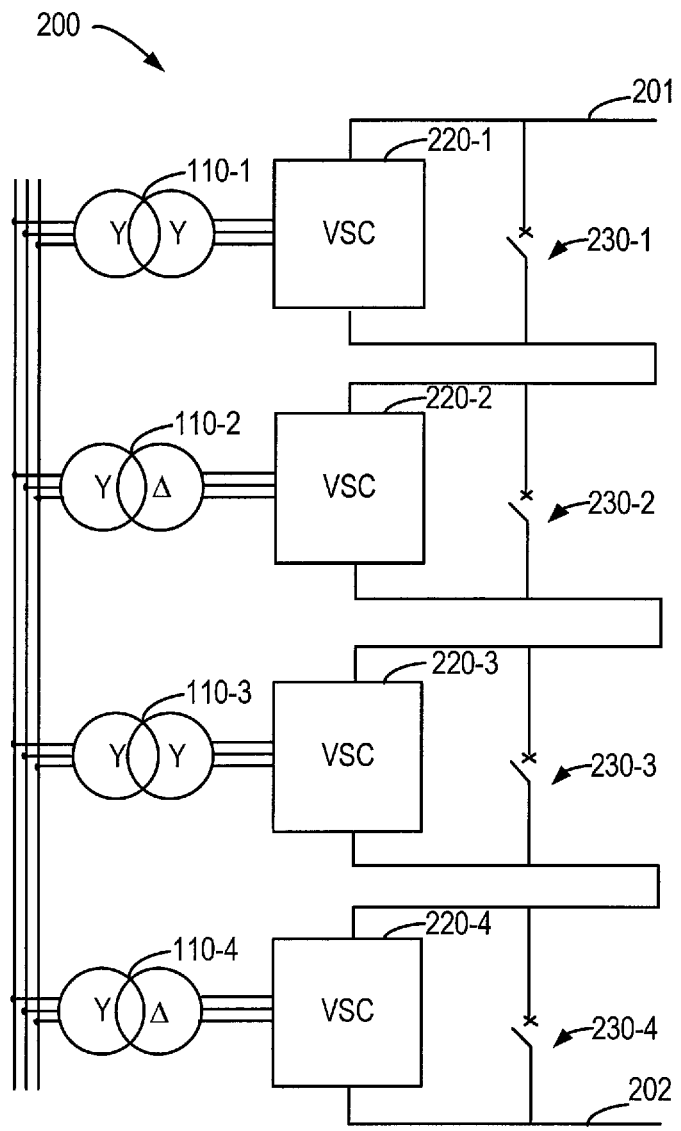

In some cases, the voltage level at the transformer valve side may be too high to be directly used with the VSC converter units 220. In some other embodiments, when upgrading the VSC system 200 from the LCC HVDC system 100, a LCC valve group in the LCC HVDC system 100 may be split into two or more VSC valve group. FIG. 2B shows the VSC system 200 according to these embodiments. As shown in FIG. 2B, the VSC system 200 includes additional bypass breakers 230-3 and 230-4. Specifically, each of the bypass breakers 230-1, 230-2, 230-3, and 230-4 is connected in parallel with a respective one of the VSC converter units 220-1, 220-2, 220-3, and 220-4. As such, the two 12-pulse valve groups consisted of the LCC converter units 120 are changed and split as four 6-pulse valve groups, each of which includes one of the VSC converter units 220 in the VSC system 200.

In the example of FIG. 2B, each of the bypass breakers 230-1, 230-2, 230-3, and 230-4 is operable to be closed to bypass the corresponding VSC converter unit 220-1, 220-2, 220-3, or 220-4. In operation, by selectively closing one or more of the bypass breakers 230-1, 230-2, 230-3, and 230-4 and thus bypassing one or more of the VSC converter units 220-1, 220-2, 220-3, and 220-4, the VSC system 200 can operate at 25%, 50%, 75%, or 100% of the full DC voltage. As such, the VSC system 200 can operate flexibly at either the full DC voltage or the reduced DC voltage to meet different DC voltage requirements.

Figure 5:
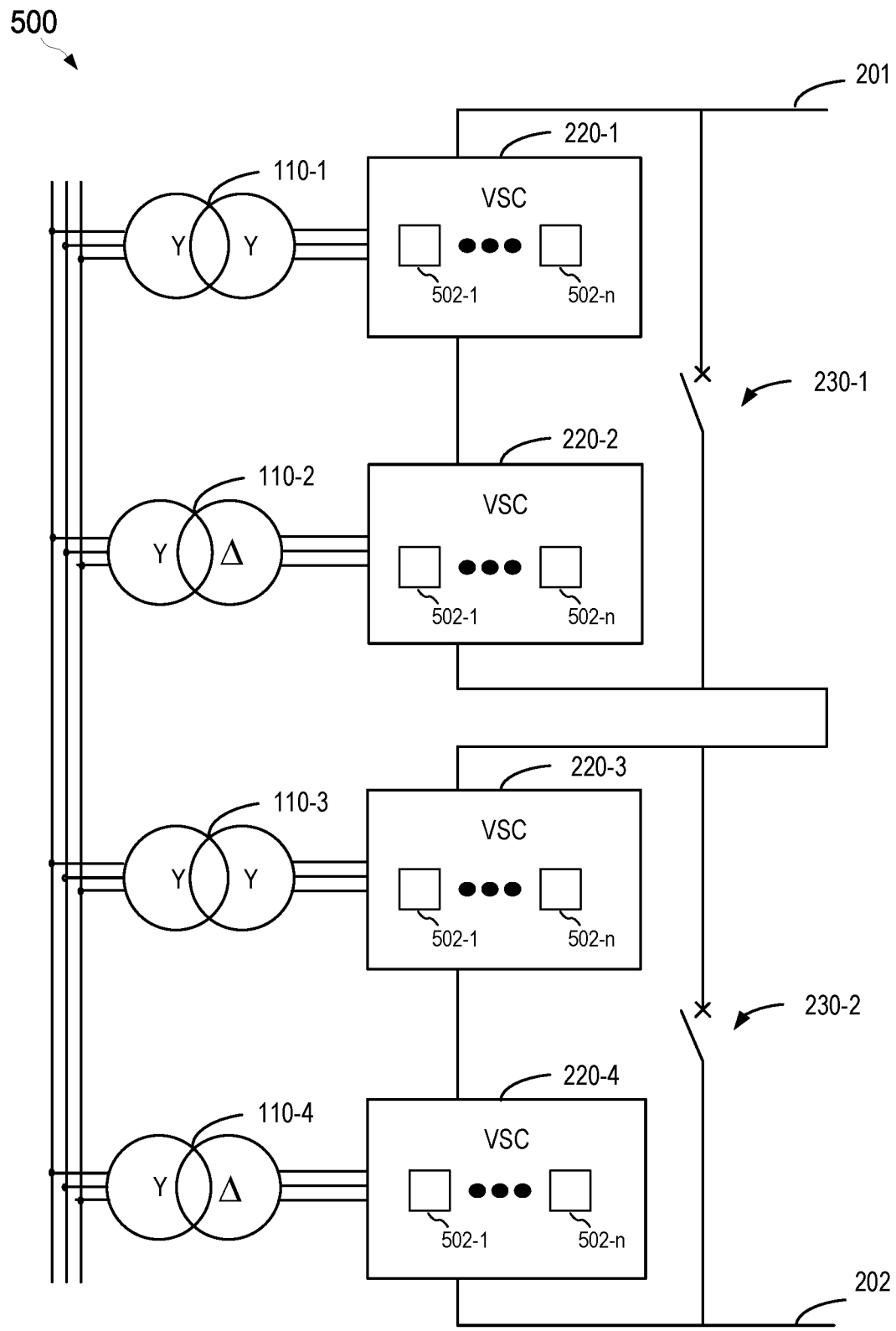
FIGS. 5, 6, and 7 illustrate schematic diagrams of VSC systems in accordance with some other example embodiments of the present disclosure Throughout the drawings, the same or corresponding reference symbols refer to the same or corresponding parts.

The VSC converter units 220 in the VSC system 200 of FIGS. 2A and 2B may be selected from various converter units that can operate using the VSC technology. FIG. 5 illustrates a schematic diagram of a VSC system 500. The components and functions attributed to the VSC system 200 of FIGS. 2A-B are similarly attributable to the VSC system 500 and the other way around. In some embodiments, the VSC converter units 220 may be implemented in a modular topology. For example, the VSC converter units 220 may include a plurality of modular multi-level converter (MMC) units 502-1 to 502-*n*, where n is an integer greater than 1. With the modular topology, the VSC system 200 can be constructed as compact and scalable to reach any number of voltage levels by a simple series connection of MMC converter units 502, resulting in higher reliability and easy maintenance.

Figure 6:
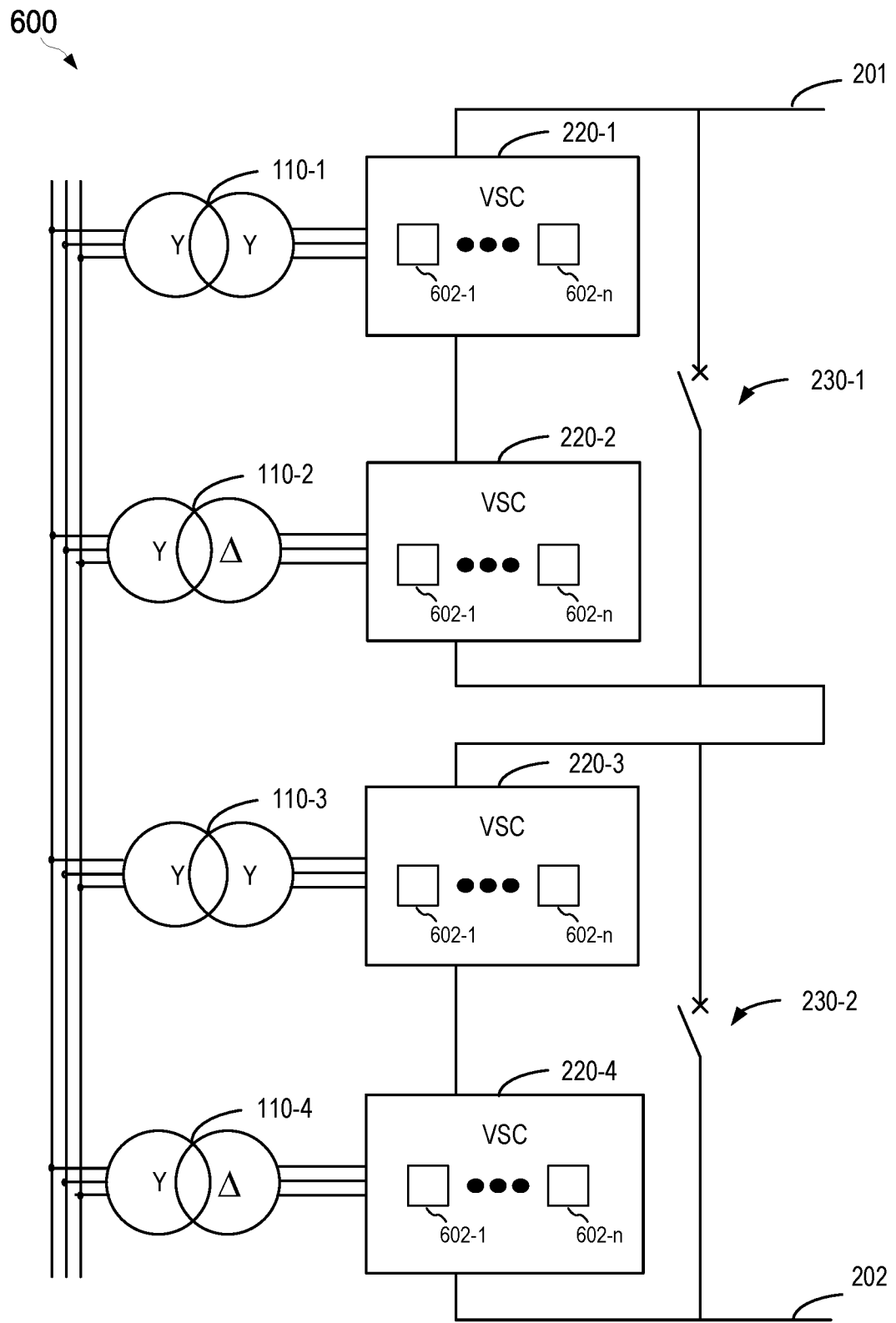

FIG. 6 illustrates a schematic diagram of a VSC system 600. The components and functions attributed to the VSC system 200 of FIGS. 2A-B and VSC system 500 of FIG. 5 are similarly attributable to the VSC system 600 and the other way around. As shown in VSC system 600, the modular topology, the VSC converter units 220 may include full-bridge MMC (FB-MMC) units 602-1 to 602-*n*, where n is an integer greater than 1. In these embodiments, the VSC system is suitable to generate negative DC voltage.

Figure 7:
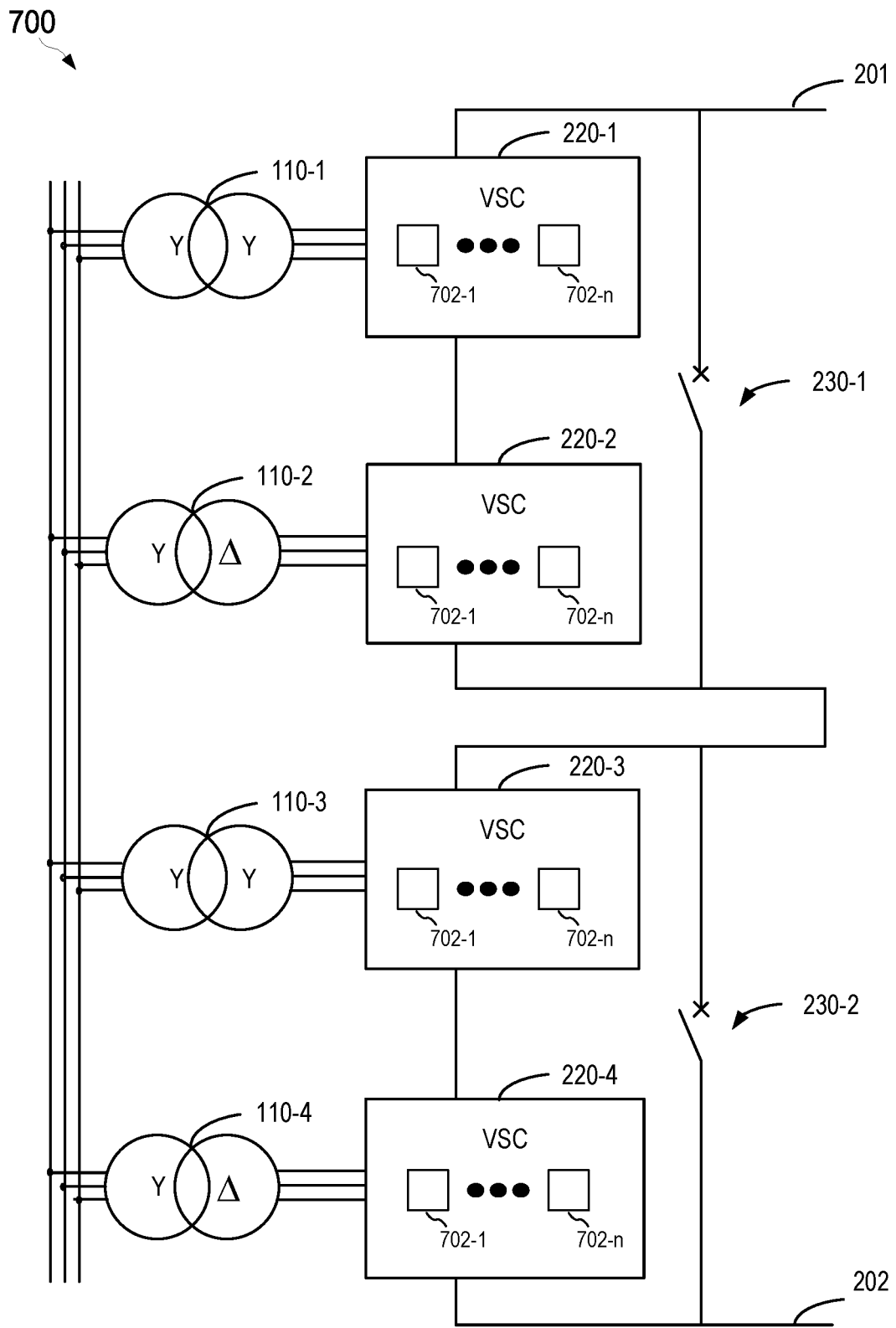

FIG. 7 illustrates a schematic diagram of a VSC system 700. The components and functions attributed to the VSC system 200 of FIGS. 2A-B, VSC system 500 of FIG. 5, VSC system 600 of FIG. 6 are similarly attributable to the VSC system 700 and the other way around. As shown in VSC system 700, the VSC converter units 220 may include half-bridge MMC (HB-MMC) units 702-1 to 702-*n*, where n is an integer greater than 1. In this embodiment, the VSC converter units 220 may be connected with respective diodes for DC fault clearing.

Figure 3:
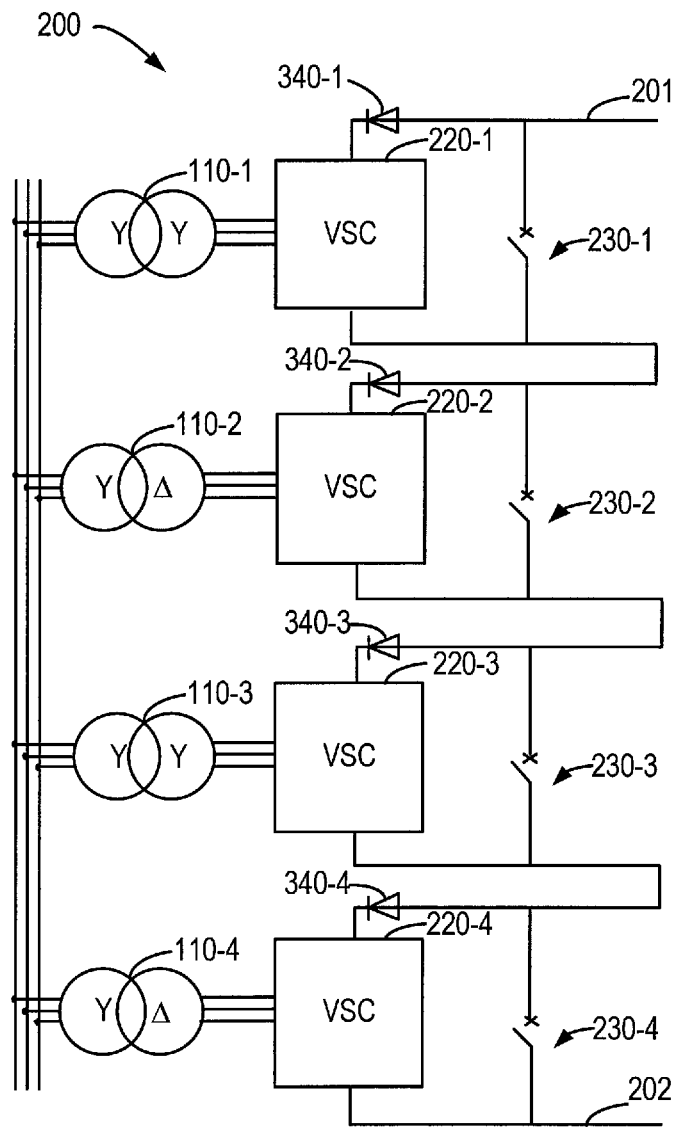
FIG. 3 illustrates a schematic diagram of a VSC system in accordance with some other example embodiments of the present disclosure.

FIG. 3 shows an example of the VSC system 200 with HB-MMC converter units. As shown, the VSC system 200 of FIG. 2B further includes a plurality of diodes 340-1, 340-2, 340-3, and 340-4 that are connected to the VSC converter units 220-1, 220-2, 220-3, and 220-4, respectively. In the example of FIG. 3, the VSC converter units 220 include HB-MMC converter units. With the topology of HB-MMC converter units and diodes in FIG. 3, the cost level and the level of power loss can be reduced as compared to the topology with FB-MMC converter units. In some embodiments, the VSC system 200 with the topology shown in FIG. 2A may also be implemented with a similar topology of HB-MMC converter units and diodes. In some other embodiments of the VSC system 200, other MMC converter units such as clamped double (CD) converter units may be alternatively utilized as the VSC converter units 220.

In addition to the LCC transformers 110, some other components in the built LCC HVDC system 100 may also be reused in the VSC system 200. In some embodiments, one or both of the bypass breakers 130-1 and 130-2 in the LCC HVDC system 100 may be reused as one or more of the bypass breakers 230-1, 230-2, 230-3, and 230-4 in the VSC system 200.

With the re-usage of the LCC transformers 110, the tap changer capability of the LCC transformers 110 can also be reused in the VSC system 200. Specifically, a plurality of tap changers included in the LCC transformers 110 are reused from the built LCC HVDC system 100. In this case, the tap changer range of the LCC transformers 110 remains consistent in the VSC system 200.

Typically, for the same DC voltage level, especially at the rectifier station, a 6-pulse LCC converter unit is typically works at a higher transformer AC voltage level than a corresponding 6-pulse VSC converter unit. Left unchanged, the AC voltage ratio may probably leave the LCC transformers 110 unusable in the VSC system 200. In embodiments of the present disclosure, with the reduced DC voltage requirements met by the bypass breakers, the tap changers at the LCC transformers 110 can significantly reduce the voltage level at the transformer valve side. As such, the VSC system 200 can work as required with the LCC transformers reused from the LCC HVDC system 100.

It would be appreciated that although two specific examples are given in FIGS. 2A and 2B, in some other examples, a different number of bypass breakers can be included in the VSC system 200, which may be operable to be closed to bypass one or more VSC converter units 220 so as to reduce the DC voltage level at which the VSC system 200 operates. For example, one or more of the bypass breakers 230-1, 230-2, 230-3, and 230-4 may be omitted from the VSC system 200 of FIG. 2B. In addition to those components shown in FIGS. 2A and 2B, the VSC system 200 may include additional components to implement the AC voltage transformation and DC-to-AC or AC-to-DC conversion and/or for other purposes.

It would also be appreciated that although the re-usage of the LCC transformers in a VSC system has been described above in the context of a single-pole and 12-pulse configuration, the LCC transformers in the built LCC systems with other configurations can also be reused for providing VSC systems. In embodiments where a VSC system is built from a LCC system with a different bipolar configuration, more bypass breakers may be introduced to connect in parallel with the VSC converter units. In some other embodiments, some but not all of the LCC transformers in the built LCC system can be reused for building a VSC system. For example, a VSC system with a single-pole configuration may be built from a LCC system with a bipolar configuration by reusing a half of LCC transformers in the LCC system.

In some embodiments, the VSC system 200 in any of FIGS. 2A and 2B can be included at a rectifier station of an HVDC system deployed at the side of power generation facilities. In this case, the VSC system 200 is operable to convert AC voltage generated by power generation facilities to DC voltage for transmission. In some embodiments, the VSC system 200 in any of FIGS. 2A, 2B, and 3 can be included at an inverter station of an HVDC system to convert DC voltage received from transmission links to AC voltage of a predetermined frequency and voltage amplitude for use.

While operations are depicted in a particular order in the above descriptions, it should not be understood as requiring that such operations be performed in the particular order shown or in sequential order, or that all illustrated operations be performed, to achieve desirable results. In certain circumstances, multitasking and parallel processing may be advantageous. Likewise, while several details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A voltage source converter (VSC) system of a high-voltage direct current (HVDC) system, the VSC system comprising:
   a plurality of line-commutated converter (LCC) transformers reused from an LCC HVDC system, each LCC transformer being operable to transform alternate current (AC) voltage, the LCC transformers including a plurality of tap changers reused from the LCC HVDC system and set such that the voltage output by each LCC transformer is lower than a maximum voltage that the LCC transformer is capable of outputting;
   a plurality of VSC units coupled in series, each LCC transformer respectively coupled to a single converter unit of only the VSC type, each VSC unit operable to convert between the AC voltage and direct current (DC) voltage; and
   a plurality of bypass breakers, each bypass breaker coupled in parallel with at least one of the VSC units and operable to be closed to bypass the at least one VSC unit.

2. The VSC system of claim 1, wherein the plurality of VSC units include a plurality of six-pulse VSC units.

3. The VSC system of claim 1, wherein the plurality of VSC units comprise a plurality of modular multi-level converter units.

4. The VSC system of claim 3, wherein the plurality of VSC units comprise a plurality of full-bridge modular multi-level converter units.

5. The VSC system of claim 3, wherein the plurality of VSC units comprise a plurality of half-bridge modular multi-level converter units, and wherein the VSC system of the HVDC system further comprises a plurality of diodes coupled to the plurality of VSC units, respectively.

6. The VSC system of claim 1, wherein the plurality of LCC transformers comprises a plurality of three-phase LCC transformers.

7. The VSC system of claim 1, wherein the plurality of LCC transformers comprises a plurality of two-winding LCC transformers.

8. The VSC system of claim 1, wherein the plurality of LCC transformers comprises a plurality of three-winding LCC transformers.

9. The VSC system of claim 1, wherein the VSC system is part of a rectifier station.

10. The VSC system of claim 1, wherein the VSC system is part of an inverter station.

11. The VSC system of claim 1, wherein the bypass breakers are reused from the LCC HVDC system.

12. A method of upgrading a line-commutated converter (LCC) high-voltage direct current (HVDC) system to a voltage source converter (VSC) HVDC system, the LCC HVDC system comprising a plurality of LCC transformers, a plurality of LCC units, and a plurality of bypass breakers, the plurality of LCC transformers include tap changers, the method comprising:
   disconnecting the LCC units from the LCC transformers;
   removing the LCC units;
   replacing the removed LCC units with a plurality of VSC units;
   coupling the VSC units in series with each other;
   coupling the VSC units to the plurality of LCC transformers, so that the VSC HVDC system comprises the plurality of VSC units coupled in series, and each LCC transformer respectively coupled to a single converter unit of only the VSC type; and
   adjusting the tap changers of the LCC transformers to lower an output voltage of the LCC transformers.

13. The method of claim 12, further comprising connecting at least one of the VSC units to one of the bypass breakers of the LCC HVDC system.

14. The method of claim 12, further comprising replacing the bypass breaker.

15. The method of claim 12, wherein the plurality of VSC units comprise a plurality of half-bridge modular multi-level converter units, the method further comprising coupling a diode to at least one of the VSC units.

16. A method of upgrading a line-commutated converter (LCC) high-voltage direct current (HVDC) system to a voltage source converter (VSC) HVDC system, the LCC HVDC system comprising a first LCC converter unit coupled between a first node and a second node, a second LCC converter unit coupled between the second node and a third node, a third LCC converter unit coupled between the third node and a fourth node, and a fourth LCC converter unit coupled between the fourth node and a fifth node, a first LCC transformer coupled between an AC network and the first LCC converter unit, a second LCC transformer coupled between the AC network and the second LCC converter unit, a third LCC transformer coupled between the AC network and the third LCC converter unit, and a fourth LCC transformer coupled between the AC network and the fourth LCC converter unit, a first bypass breaker coupled between the first node and the third node, and a second bypass breaker coupled between the third node and the fifth node, the method comprising:
   replacing the first LCC converter unit with a first VSC converter unit and coupling the first VSC converter unit to the first LCC transformer, the first node, and the second node;
   replacing the second LCC converter unit with a second VSC converter unit and coupling the second VSC converter unit to the second LCC transformer, the second node, and the third node;
   replacing the third LCC converter unit with a third VSC converter unit and coupling the third VSC converter unit to the third LCC transformer, the third node, and the fourth node;
   replacing the fourth LCC converter unit with a fourth VSC converter unit and coupling the fourth VSC converter unit to the fourth LCC transformer, the fourth node, and the fifth node;
   coupling a third bypass breaker between the first node and the second node;

coupling a fourth bypass breaker between the second node and the third node;
coupling a fifth bypass breaker between the third node and the fourth node;
coupling a sixth bypass breaker between the fourth node and the fifth node; and
adjusting tap changers of the first, second, third, and fourth LCC transformers to lower an output voltage of these LCC transformers.

17. The method of claim 16, wherein one of the third, fourth, fifth or sixth bypass breakers is the first bypass breaker of the LCC HVDC system.

18. The method of claim 17, wherein another one of the third, fourth, fifth or sixth bypass breakers is the second bypass breaker of the LCC HVDC system.

19. The method of claim 16, wherein the first, second, third, and fourth VSC converter units comprise a plurality of half-bridge modular multi-level converter units, the method further comprising coupling a diode to at least one of the VSC converter units.

\* \* \* \* \*